United States Patent [19]
Barlow

[11] Patent Number: 4,788,128
[45] Date of Patent: * Nov. 29, 1988

[54] TRANSFER PRINTING MEDIUM WITH THERMAL TRANSFER DYE AND INFRA-RED RADIATION PHTHALOCYANINE ABSORBER

[75] Inventor: William A. Barlow, Liverpool, England

[73] Assignee: Imperial Chemical Industries PLC, London, England

[ * ] Notice: The portion of the term of this patent subsequent to Aug. 19, 2003 has been disclaimed.

[21] Appl. No.: 920,948

[22] Filed: Oct. 20, 1986

Related U.S. Application Data

[63] Continuation of Ser. No. 716,140, Mar. 26, 1985, abandoned.

[30] Foreign Application Priority Data

Mar. 30, 1984 [GB] United Kingdom ................. 8408259

[51] Int. Cl.[4] ......................... G03C 1/00; G03C 5/16; G01D 15/10; G01D 15/16

[52] U.S. Cl. ...................................... 430/200; 106/22; 346/76 R; 346/766; 346/135.1; 346/140 R; 428/913; 430/201; 430/495; 430/944; 430/945; 540/122; 540/124; 540/139

[58] Field of Search ............... 430/200, 201, 495, 945, 430/944; 428/913; 346/76 R, 76 L, 135.1, 140 R; 106/22; 260/245.8 C, 245.88, 245.72

[56] References Cited

U.S. PATENT DOCUMENTS 2,915,392 12/1959 Pedersen ............................ 430/325
3,105,070 9/1963 Bitterli ............................ 260/245.72
3,646,003 2/1972 Lamure .......................... 260/245.75
3,918,895 11/1975 Mizuno .............................. 427/152
3,981,734 9/1976 Cabot et al. .................. 260/245.8 C
4,027,345 6/1977 Fujisawa et al. .................... 427/152
4,042,413 8/1977 Hauxwell et al. .................... 524/88
4,106,027 8/1978 Hoffmann et al. .................... 106/22
4,224,212 9/1980 Topham ............................. 524/190
4,529,688 7/1985 Low et al. ........................... 430/276
4,565,842 1/1986 Fitzer et al. .......................... 525/125
4,606,859 8/1986 Duggan et al. ...................... 540/122

FOREIGN PATENT DOCUMENTS 1268422 3/1972 United Kingdom ........... 260/245.88

*Primary Examiner*—Charles Bowers, Jr.
*Attorney, Agent, or Firm*—Cushman, Darby & Cushman

[57] ABSTRACT

A transfer printing medium comprising a substrate supporting a thermal transfer dye and a radiation absorber positioned to provide thermal energy to the transfer dye when subjected to radiation within a predetermined absorption waveband, has a radiation absorber which is an infra-red absorbing poly(substituted)phthalocyanine compound in which each of at least five of the peripheral carbon atoms in the 1, 4, 5, 8, 9, 12, 13 or 16 positions (the "3,6-positions") of the phthalocyanine nucleus, as shown in Formula I, is linked by an atom from Group VB or Group VIB of the Periodic Table, other than oxygen, to a carbon atom of an organic radical. In preferred compounds each of the eight 3,6-positions is linked by an atom from Group VB or Group VIB, especially sulphur, selenium or nitrogen, to an organic radical.

9 Claims, No Drawings

TRANSFER PRINTING MEDIUM WITH THERMAL TRANSFER DYE AND INFRA-RED RADIATION PHTHALOCYANINE ABSORBER

This is a continuation of application Ser. No. 716,140 filed Mar. 26, 1985 now abandoned.

The invention relates to laser transfer printing, and especially to apparatus suitable for printing multicolour designs and patterns.

Transfer printing is a technique which has been used for many years for printing patterns onto textiles and other receptor surfaces, and employs volatile or (more usually) sublimeable dyes, generally referred to collectively as "thermal transfer dyes". The thermal transfer dyes, usually in a formulation including a binder, are supported on a substrate such as paper, then, when eventually used, they are held firmly against the textile or other receptor surface and heat is applied to volatilise or sublime the dye onto that surface. The printing medium used for printing textiles thus usually comprises the various dyes printed onto the substrate in the form of the final pattern, and this is transferred by heating the whole area using a heated plate or roller. Thermal transfer dyes in a wide range of colours have been developed for such processes.

A more recent development is to use a laser as a source of energy for transferring the dyes. This enables just a single, very small, selected area to be heated at any one time, with only a corresponding small area of the dye being transferred, and by heating such selected areas in turn, the desired pattern can be built up, pixel by pixel, from a uniform sheet of printing medium. Computer control of such operations can enable complex designs of high definition to be printed at high speed, including multicolour designs by printing the different colours sequentially, either from different single colour sheets or from multicolour sheets carrying the different colours in different zones which can be brought into position in turn.

The transfer dyes can be heated directly by using a laser whose radiation lies within a strong absorption waveband of the dye, usually the complementary colour of the dye. However, this need to match the dye and the laser does restrict the choice of colours, and multicolour patterns require a corresponding number of lasers, one for each colour. The dyes can also be heated indirectly by incorporating a separate radiation absorber positioned to provide thermal energy to the transfer dyes when subjected to radiation within a predetermined absorption waveband, i.e. with writing radiation. This has previously been achieved by mixing carbon black with the transfer dye so that radiation of a wavelength different from that absorbed by the dye can be used. When printing with several colours, this has advantages in that the thermal energy produced is consistent with respect to the writing radiation irrespective of the colours used, and only a single laser is required. However we found that this did not prove entirely satisfactory because even though the carbon black would not sublime or volatilise like the dye, small particles did tend to be carried over with the dye molecules, thereby producing very obvious contamination.

According to the present invention a transfer printing medium comprises a substrate supporting a thermal transfer dye and a radiation absorber positioned to provide thermal energy to the transfer dye when subjected to radiation within a predetermined absorption waveband, characterised in that the radiation absorber is a poly(substituted)phthalocyanine compound in which each of at least five of the peripheral carbon atoms in the 1, 4, 5, 8, 9, 12, 13 or 16 positions of the phthalocyanine nucleus, as shown in Formula I is linked by an atom from Group VB or Group VIB of the Periodic Table, other than oxygen, to a carbon atom of an organic radical.

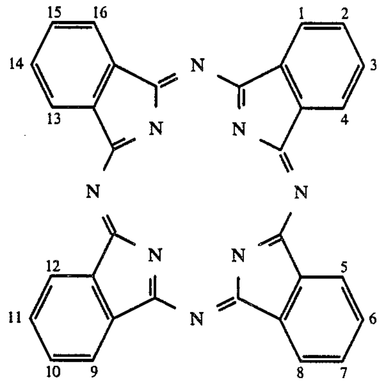

I

The specified poly(substituted)phthalocyanine compounds absorb in the near infra-red region of the electro-magnetic spectrum, e.g. from 750 to 1500 nm, but mainly from 750 to 1100 nm, with only very weak absorption in the visible region (i.e. within the range of about 400–700 nm). The advantage of this is that should any of the present absorbers be carried over with the transfer dye during writing, it will not affect the colour balance of the transferred design. Moreover suitable infra-red lasers are available, including semiconductor diode lasers, which are generally cheap and can be matched to a range of dyes, and neodymium YAG lasers for giving radiation well into the near infra red at 1060 nm.

The carbon atoms in the 1, 4, 5, 8, 9, 12, 13 and 16 positions are hereinafter referred to as the "3,6-carbon atoms" by relation to the equivalent 3,6-positions in the four molecules of phthalic anhydride, see Formula II, from which the phthalocyanine can be derived.

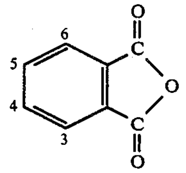

II

The remaining peripheral atoms of the phthalocyanine nucleus may be unsubstituted, i.e. carry hydrogen atoms, or be substituted by other groups, for example, halogen atoms or amino groups, or they may also be linked by an atom from Group VB or Group VIB of the Periodic Table to a carbon atom of an organic radical. It is preferred that each of at least six, and more preferably at least eight, of the 3,6 carbon atoms is linked by a Group VB or Group VIB atom to an organic radical.

The organic radical may be an optionally substituted aliphatic, alicyclic or aromatic radical and is preferably an optionally substituted aromatic radical, especially from the benzene, naphthalene and mono- or bi-cyclic, heteroaromatic series. Examples of suitable aromatic radicals are optionally substituted phenyl, phenylene, naphthyl, especially naphth-2-yl, naphthylene, pyridyl, thiophenyl, furyl, pyrimidyl and benzthiazolyl. Aliphatic radicals are preferably from the alkyl and alkenyl series containing up to 20 carbon atoms, such as vinyl, allyl, butyl, nonyl, dodecyl, octadecyl and octadecenyl. Alicyclic radicals are preferably homocyclic containing from 4 to 8 carbon atoms, such as cyclohexyl. The organic radical may be monovalent and attached to a single peripheral carbon atom through a single Group VB or Group VIB atom or it may be polyvalent, preferably divalent, and attached to adjacent peripheral carbon atoms through identical or different atoms from Group VB and Group VIB. Where the organic radical is polyvalent it may be attached to two or more phthalocyanine nuclei.

Examples of substituents for the aromatic and heteroaromatic radicals are alkyl, alkenyl, alkoxy and alkylthio, and halo substituted derivatives thereof, especially those containing up to 20 carbon atoms, aryl, arylthio, especially phenyl and phenylthio, halogen, nitro, cyano, carboxyl, aralkyl, aryl- or alkyl-sulphonamido, aryl- or alkyl-sulphone, aryl- or alkyl-sulphoxide, hydroxy and primary, secondary or tertiary amino. Examples of substituents for the aliphatic and cycloaliphatic radicals are alkoxy, alkylthio, halo, cyano and aryl. In these substituents the alkyl and alkenyl groups preferably contain up to 20, and more preferably up to 4, carbon atoms and the aryl groups are preferably mono- or bi-homo- or hetero-cyclic. Specific examples of substituents are methyl, ethyl, dodecyl, methoxy, ethoxy, methylthio, allyl, trifluoromethyl, bromo, chloro, fluoro, benzyl, COOH, $-COOCH_3$, $-COOCH_2C_6H_5$, $-NHSO_2CH_3$, $-SO_2C_6H_5$, $NH_2$, $-NHC_2H_5$, and $H(CH_3)_2$.

Examples of suitable atoms from Group VB and Group VIB for linking the organic radical to a peripheral carbon atom of the phthalocyanine nucleus are sulphur, selenium, tellurium and nitrogen or any combination of these. Where an organic radical is linked to adjacent peripheral carbon atoms the second bridging atom may be any atom from Group VB or Group VIB and examples are sulphur, oxygen, selenium, tellurium and nitrogen. Where the linking atom is nitrogen the free valency may be substituted or unsubstituted, e.g. it may carry an alkyl group, preferably $C_{1-4}$-alkyl or an aryl group, preferably phenyl.

The phthalocyanine compounds of the present invention can be prepared by heating a phthalocyanine compound carrying halogen atoms attached to the peripheral carbon atoms to which it is wished to attach the Group VB or Group VIB atoms, with at least six equivalents of an organic thiol or an equivalent compound in which the sulphur in the thiol group is replaced by selenium (selenol), tellurium (tellurol) or NT (amine), in an organic solvent.

The organic solvent, which need not necessarily be a liquid at ambient temperatures and may only partially dissolve the reactants, preferably has a boiling point from 100° C. to 300° C. and more preferably from 150° C. to 250° C. The organic solvent is preferably essentially inert although it may catalyse the reaction. Examples of suitable solvents are methylcyclohexanol, octanol, ethylene glycol, and especially benzyl alcohol and quinoline.

Reaction is conveniently carried out under reflux, preferably from 100° C. to 250° C. and more preferably above 150° C., in the presence of an acid binding agent, such as potassium or sodium hydroxide or sodium carbonate, to neutralise the halo acid formed. The product may be isolated by filtration or by distillation of the organic liquid. The isolated product is preferably purified by repeated recrystallisation from a suitable solvent, such as ethanol, chloroform or pyridine, and/or chromatography, using a silica-filled column and an aromatic solvent, such as toluene or xylene, as eluent.

The phthalocyanine nucleus may be metal free, i.e. it may carry two hydrogen atoms at the centre of the nucleus, or it may be complexed with a metal or oxymetal derivative, i.e. it may carry one or two metal atoms or oxy-metal groups complexed within the centre of the nucleus. Examples of suitable metals and oxymetals are copper, lead, cobalt, nickel, iron, zinc, germanium, indium, magnesium, calcium, palladium, gallium and vanadium.

The radiation absorber and transfer dye are preferably intimately mixed in a common coating layer on the supporting substrate. However, an alternative arrangement that can also work is one in which they are arranged as separate layers on the same side of the substrate, preferably with the radiation absorber forming the layer nearer to the substrate.

For supporting the dyes in the printing medium we prefer to use a polyester film, such as Melinex film, to take advantage of its high transparency in the near infrared, and its generally good heat stability.

EXAMPLES

The following poly(substituted)phthalocyanine compounds were prepared and their absorption maxima measured as solutions in chloroform (Chlor), toluene (Tol) or after deposition on glass (Glass) unless otherwise indicated. Extinction coefficients were determined in toluene or the only solvent in which the absorption maximum was recorded.

| Example | Product | Absorption Maxima (nm) Chlor | Tol | Glass | Extinction Coefficient |
|---|---|---|---|---|---|
| 1 | octa-3,6-(4-methylphenylthio)-$H_2Pc$ | 813 | 805 | 828 | 170,000 |
| 2 | octa-3,6-(4-methylthio)-CuPc | 797 | 787 | 797 | 156,000 |
| 3 | octa-3,6(3-methylphenylthio)$H_2Pc$ | 805 | 797 | 818 | 160,000 |
| 4 | hepta-3,6(4-t-butylphenylthio)$H_2Pc$ | 798 | 790 | | 173,000 |
| 5 | octa-3,6(4-t-butylphenylthio)$H_2Pc$ | 793 | | 797 | 152,000 |
| 6 | octa-3,6(4-t-butylphenylthio)CuPc | 803 | | 797 | 216,000 |
| 7 | hepta-3,6(4-n-nonylphenylthio)$H_2Pc$ | 800 | | 809 | |

-continued

| Example | Product | Absorption Maxima (nm) Chlor | Tol | Glass | Extinction Coefficient |
|---|---|---|---|---|---|
| 8 | hepta-3,6(4-dodecylphenylthio)$H_2$Pc | 789 | 787 | 795 | |
| 9 | hexa-3,6(3,4-dimethylphenylthio)$H_2$Pc | 807 | 803 | 830 | |
| 10 | octa-3,6(4-methoxyphenylthio)$H_2$Pc | 799 | 792 | | 161,500 |
| 11 | octa-3,6(4-methoxyphenylthio)CuPc | 805 | | 813 | 155,000 |
| 12 | octa-3,6(4-butoxyphenylthio)CuPc | 800 | 786 | | |
| 13 | octa-3,6(4-dodecyloxyphenylthio)$H_2$Pc | 818 | 808 | 859 | |
| 14 | octa-3,6(4-dodecyloxyphenylthio)CuPc | 807 | 794 | 822 | |
| 15 | octa-3,6(naphth-2-ylthio)CuPc | 799 | | 796 | 136,000 |
| 16 | octa-3,6(4-octoxyphenylthio)$H_2$Pc | 816 | 806 | 846 | |
| 17 | penta-3,6(4-octoxyphenylthio)CuPc | 775 | | | |
| 18 | pentadeca(4-methylthio)-CuPc | 775 | 768 | 790 | 169,000 |
| 19 | deca(4-methylthio)-pentachloro-CuPc | 758 | 752 | 770 | 174,000 |
| 20 | pentadeca(t-butylphenylthio)CuPc | 774 | 760 | 784 | 142,000 |
| 21 | pentadeca(3-methylphenylthio)CuPc | 771 | 766 | 786 | |
| 22 | pentadeca(4-methoxyphenylthio)CuPc | 786 | | 801 | 190,000 |
| 23 | terdeca(4-butoxyphenylthio)CuPc | 775 | 768 | 797 | 158,000 |
| 24 | pentadeca(4-butoxyphenylthio)CuPc | 786 | 780 | 801 | 182,000 |
| 25 | pentadeca(4-dodecoxyphenylthio)CuPc | 778 | 770 | 792 | 162,000 |
| 26 | pentadeca(phenylthio) CuPc | 772 | 768 | 794 | |
| 27 | tetradeca(2-methoxyphenylthio)CuPc | 770 | | | |
| 28 | pentadeca(4-methylthiophenylthio)CuPc | 788 | 784 | 810 | 208,500 |
| 29 | deca(4-ethylthiophenylthio)CuPc | 756 | 752 | | |
| 30 | pentadeca(4-chlorophenylthio)CuPc | 774 | | 787 | 181,000 |
| 31 | unadeca(4-dimethylaminophenylthio)CuPc | 782 | | 805 | 118,000 |
| 32 | terdeca(naphth-1-ylthio)CuPc | 765 | 760 | | |
| 33 | pentadeca(naphth-2-ylthio)CuPc | 786 | 781 | 799 | 197,000 |
| 34 | pentadeca(phenylseleno)CuPc | 776 | | | |
| 35 | hexadeca(4-methylphenyl-thio)PbPc | 769 | | 792 | |
| 36 | hexadeca(4-methylphenylthio)$H_2$Pc | 769 | | | |
| 37 | hexadeca(4-methylphenylthio)CuPc | 778 | 770 | 796 | 220,000 |
| 38 | hexadeca(4-methylphenylthio)ZnPc | 768 | | 791 | |
| 39 | hexadeca(4-chlorophenylthio)CuPc | 770 | | 789 | 220,000 |
| 40 | deca(naphth-2-ylthio) $H_2$Pc | 744 | | | |
| 41 | hepta(4-methylphen-1,2-ylene-dithio)-di(4-methyl-2-thiolphenylthio)-$H_2$Pc | 800 | 797 | 832 | 94,000 |
| 42 | hepta(4-methylphen-1,2-dithio-ylene)-mono (4-methyl-2-thio-phenylthio)-CuPc | 790 | 787 | 828 | 91,000 |
| 43 | penta(phen-1-amino-2-thio-ylene)-penta(2-aminophenylthio)-CuPc | 909 | (in pyridine) | | |
| 44 | pentadeca(ethylthio)-monoisoamyloxy-$H_2$Pc | 804 | 807 | 827 | |

-continued

| Example | Product | Absorption Maxima (nm) Chlor | Tol | Glass | Extinction Coefficient |
|---|---|---|---|---|---|
| 45 | hexadeca(cyclohexylthio)-ZnPc | 846 | 852 | 860 | 95,000 |
| 46 | tetradeca(ethylthio) monoamyloxy-$H_2Pc$ | 801 | 802 | | |
| 47 | $(ethylthio)_{15.3}$ $(amyloxy)_{0.7}$-$H_2Pc$ | 805 | 808 | 830 | 149,000 |
| 48 | hexadeca(n-propylthio)-$H_2Pc$ | 802 | 800 | 819 | 157,600 |
| 49 | pentadeca(i-propylthio)monoamyloxy-$H_2Pc$ | 809 | | 823 | 136,500 |
| 50 | pentadeca(n-butylthio)monoamyloxy-$H_2Pc$ | 807 | | 817 | 147,000 |
| 51 | pentadeca(n-pentylthio)monoamyloxy-$H_2Pc$ | 802 | 802 | | 162,500 |
| 52 | octa(butylthio)octa (ethylthio)-$H_2Pc$ | 809 | 805 | 815 | 129,000 |
| 53 | octa(butylthio)octa (ethylthio)-$H_2Pc$ | 803 | 797 | 815 | 115,500 |
| 54 | pentadeca(cyclohexylthio)monoamyloxy-$H_2Pc$ | 812 | 810 | 818 | 120,000 |
| 55 | hexadeca(n-octylthio)-$H_2Pc$ | 818 | 811 | | |
| 56 | pentadeca(s-butylthio)monoamyloxy-$H_2Pc$ | 805 | 801 | | 133,000 |
| 57 | pentadeca(benzylthio) monoamyloxy-$H_2Pc$ | 810 | 809 | | 84,000 |
| 58 | hexadeca(phenylthio)-$H_2Pc$ | 790 | | | |
| 59 | octa-3,6-(isopropylthio)-$H_2Pc$ | 802 | | | 167,000 |
| 60 | pentadeca(n-propylthio)monoamyloxy-CuPc | 783 | 785 | 805 | 170,500 |
| 61 | pentadeca(n-pentylthio)monoamyloxy-CuPc | 784 | 783 | | 182,000 |
| 62 | pentadeca(cyclohexylthio)monoamyloxy-CuPc | 789 | 781 | 803 | 163,000 |
| 63 | pentadeca-s-butylthio)monoaryloxy-CuPc | 787 | 778 | | 168,000 |
| 64 | pentadeca(benzylthio) monoaryloxy-CuPc | 797 | 789 | | 109,000 |
| 65 | pentadeca(cyclohexylthio)monoamyloxy-PbPc | 838 | 830 | 840 | 111,000 |
| 66 | octapiperidino-octachloro-$H_2Pc$ | 835 | | | |

I claim:

1. A transfer printing medium comprising a substrate supporting a thermal transfer dye and a radiation absorber either intimately mixed in a common coating layer or arranged as separate layers on the same side of the substrate, thereby being positioned for the absorber to provide thermal energy to the transfer dye when subjected to radiation within the near infra-red region of the electromagneic spectrum, said radiation absorber being a poly(substituted)phthalocyanine compound in which each of at least five of the peripheral carbon atoms in the 1, 4, 5, 8, 9, 12, 13 and 16 positions of the phthalocyanine nucleus of Formula I

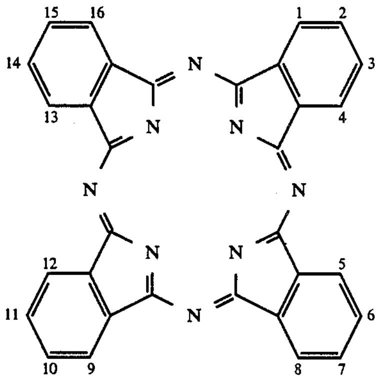

I is linked by an atom of nitrogen, sulfur, selenium or tellurium to a carbon atom of an organic radical, said organic radical being (i) an unsubstituted aliphatic radical,
(ii) an unsubstituted cycloaliphatic radical,
(iii) an unsubstituted aromatic radical,
(iv) an aliphatic radical substituted by alkoxy, alkylthio, halo, cyano or aryl, (v) a cycloaliphatic radical substituted by alkoxy, alkylthio, halo, cyano or aryl, or (vi) an aromatic radical substituted by alkyl, alkenyl, alkoxy or alkylthio, or halo substituted derivatives thereof, aryl, arlythio, halogen, nitro, cyano, carboxyl, aralkyl, aryl-sulphonamido, alkyl-sulphonamido, aryl-sulphone, alkyl-sulphone, aryl-sulphoxide, alkyl-sulphoxide, hydroxy, primary amino, secondary amino or tertiary amino.

2. The transfer printing medium of claim 1 wherein each of the eight peripheral carbon atoms in the 1, 4, 5, 8, 9, 12, 13 and 16 positions of said phthalocyanine nucleus is linked by an atom of nitrogen, sulfur, selenium or tellurium to a carbon atom of an organic radical.

3. The transfer printing medium of claim 2 wherein the remaining peripheral carbon atoms of said phthalocyanine nucleus are unsubstituted.

4. The transfer printing medium of claim 3 wherein said organic radical is (i) phenyl, (ii) naphthyl, (iii) mono- or bi-cyclic heteroaromatic radical, or (iv) at least one of (i), (ii) or (iii) substituted by alkyl, alkenyl, alkoxy or alkylthio, or a halo substituted derivative thereof, aryl, arylthio, halogen, nitro, cyano, carboxyl, aralkyl, aryl-sulphonamido, alkyl-sulphonamido, aryl-sulphone, alkyl-sulphone, aryl-sulphoxide, alkyl-sulphoxide, hydroxy, primary amino, secondary amino or tertiary amino.

5. The transfer printing medium of claim 1 wherein said organic radical is bivalent and is attached to adjacent peripheral carbon atoms on said phthalocyanine nucleus through atom of nitrogen, sulfur, selenium or tellurium.

6. The transfer printing medium of claim 1 wherein said radiation absorber and said thermal transfer dye are intimately mixed in a common coating layer on said supporting substrate.

7. The transfer printing medium of claim 1 wherein said substrate is a polyester film transparent to radiation in the near infra-red.

8. The transfer printing medium of claim 7 wherein the radiation absorber is octa-3,6-(alkylphenyltio) MPc wherein M is metal or $H_2$.

9. The transfer printing medium of claim 8 wherein the radiation absorber is octa-3,6-(4-methylphenylthio)-$H_2$Pc.

* * * * *